(12) United States Patent
Gilbert et al.

(10) Patent No.: US 11,463,446 B2
(45) Date of Patent: Oct. 4, 2022

(54) TEAM MEMBER TRANSFER TOOL

(71) Applicant: Dropbox, Inc., San Francisco, CA (US)

(72) Inventors: Mark Gilbert, San Francisco, CA (US);
Lucia Zhang, San Francisco, CA (US);
Chloe Fan, San Francisco, CA (US);
Niklas Nordlof, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/035,642

(22) Filed: Sep. 28, 2020

(65) Prior Publication Data

US 2022/0103565 A1 Mar. 31, 2022

(51) Int. Cl.
*H04L 29/06* (2006.01)
*H04L 9/40* (2022.01)
*H04L 67/306* (2022.01)

(52) U.S. Cl.
CPC .......... *H04L 63/104* (2013.01); *H04L 63/102* (2013.01); *H04L 67/306* (2013.01)

(58) Field of Classification Search
CPC ... H04L 63/104; H04L 63/102; H04L 67/306; G06F 16/337; G06F 16/955; G06F 21/6218
See application file for complete search history.

(56) References Cited

U.S. PATENT DOCUMENTS

| | | | |
|---|---|---|---|
| 9,430,549 B2 | 8/2016 | Guo et al. | |
| 9,678,978 B2 | 6/2017 | James et al. | |
| 9,749,408 B2 | 8/2017 | Subramani et al. | |
| 9,898,480 B2 | 2/2018 | Fushman et al. | |
| 10,678,936 B2 | 6/2020 | Yarlagadda et al. | |
| 10,715,634 B2 | 7/2020 | Solis et al. | |
| 2016/0098668 A1* | 4/2016 | Hojby | G06Q 10/063118 705/7.17 |
| 2017/0061027 A1* | 3/2017 | Chesla | G06F 16/955 |
| 2017/0235490 A1* | 8/2017 | Tan | G06F 21/6218 711/152 |
| 2017/0249330 A1 | 8/2017 | Chung | |
| 2017/0250969 A1* | 8/2017 | O'Brien | G06F 16/337 |
| 2019/0334881 A1 | 10/2019 | Mityagin et al. | |
| 2020/0233880 A1 | 7/2020 | Goldberg et al. | |
| 2021/0082309 A1* | 3/2021 | Rosenberg | G09B 7/02 |
| 2021/0165759 A1* | 6/2021 | Bar-Nissan | G06F 21/6218 |

* cited by examiner

*Primary Examiner* — Jungwon Chang
(74) *Attorney, Agent, or Firm* — Polsinelli PC

(57) ABSTRACT

The present technology can provide a mechanism for providing a team member transfer interface to an administrator user for transferring team member user accounts from one team to another and also a mechanism for transferring the team member user accounts, such as by switching an assignment of one or more user accounts from a first team to another in a single atomic action. The transferring of the team member user accounts may also depend on passing a set of validation checks that check for inconsistencies that could cause an error in the transfer, and also updating access and privileges associated with being members of certain teams.

18 Claims, 17 Drawing Sheets

Move members to another team

Here are some ways to get shared folders set for the move. Keep in mind members will always lose access to all of their old team folders.

*Control whether a shared folder moves too*
Shared folders will move with their owner, so update the owner to someone else who's not moving.

*Make sure moved members can keep access to shared folders*
If you want members to keep access to shared folders form their old team, set the folder membership for each to "Anyone."

*Create new links for shared folders*
Links could stop working if they were created by a member who's moved

Move 3 members to Entrepreneur Eagles?

 They'll keep their own stuff and shared folders
They'll keep access to their own content, any shared folders, and anything in a team folder.

 Their former team won't lose access to shared folders
Shared folders will move with their owner to the new team, but their former team members won't lose access.

 You might need to set a few things up
The new team might have different settings for things like security or groups that members will need your help setting up.

 While a member's account is being moved, they should take a break from working in Dropbox

Step 2 of 2

Back    Cancel  Start move

Admin Console

- Dashboard
- Members
- Groups
- Content
- Activity
- Settings
- Billing
- Help Entrepreneurial Eagle
4 members Settings > Trust You're moving 3 members.  View progress —412

Teams you manage

Sign in to a trusted team's admin console to manage settings.

E  Entrepreneurial Eagle
Organization admins      Members        Plan
Eagle Admin              4 members      Enterprise        Sign in  •••

Add a team

☐ Trusted team activity
↕ Move members

FIG. 4C

TEAM MEMBER TRANSFER TOOL

TECHNICAL FIELD

The present technology pertains to transferring team member user accounts by an administrator user having administrator rights, and more specifically, by transferring team member user accounts without an intermediate state.

BACKGROUND

Team management for a content management system may allow privileges for a set of content items to be extended to user accounts associated with a particular team. At one time or another, one or more user accounts may need to change teams, which can be from one team to another under the same corporate or organization account or to another corporate or organization account but under the same content management system.

In some cases, transferring user accounts from one team to another may require the transferring user account to leave its original or source team and revert into a personal account before the user account can be added to the destination team. This is not favorable for user accounts under corporate or enterprise accounts, given this may inevitably force the user account to break certain obligations under its terms of services agreement and/or employment contract for a period of time.

In other cases, the transferring user accounts may be required to remain in an intermediate state for a period of time before being added to the destination team, where the user accounts do not belong to any team. This may cause errors, such as failing to be transferred to the destination team properly, if there is a shortage of a number of licenses available to join the team, for example.

Nonetheless, in all these cases, the issue lies in that the one or more transferring user accounts fail to migrate directly from one team to another in a seamless fashion. Moreover, there is no means for an administrator to initiate a transfer of one or more user accounts from one team to another.

BRIEF DESCRIPTION OF THE DRAWINGS

FIG. 3C illustrates an example graphical user interface of a team member transfer interface, in accordance with some embodiments of the present technology;

FIG. 3D illustrates an example graphical user interface of a team member transfer interface, in accordance with some embodiments of the present technology;

FIG. 3E illustrates an example graphical user interface of a team member transfer interface, in accordance with some embodiments of the present technology;

FIG. 3F illustrates an example graphical user interface of a team member transfer interface displaying an informational prompt, in accordance with some embodiments of the present technology;

FIG. 4B illustrates an example of notification and progress reporting with respect to the transfer of the team member user accounts, in accordance with some embodiments of the present technology;

FIG. 4C illustrates an example of notification and progress reporting with respect to the transfer of the team member user accounts, in accordance with some embodiments of the present technology;

DETAILED DESCRIPTION

Figure 1A:
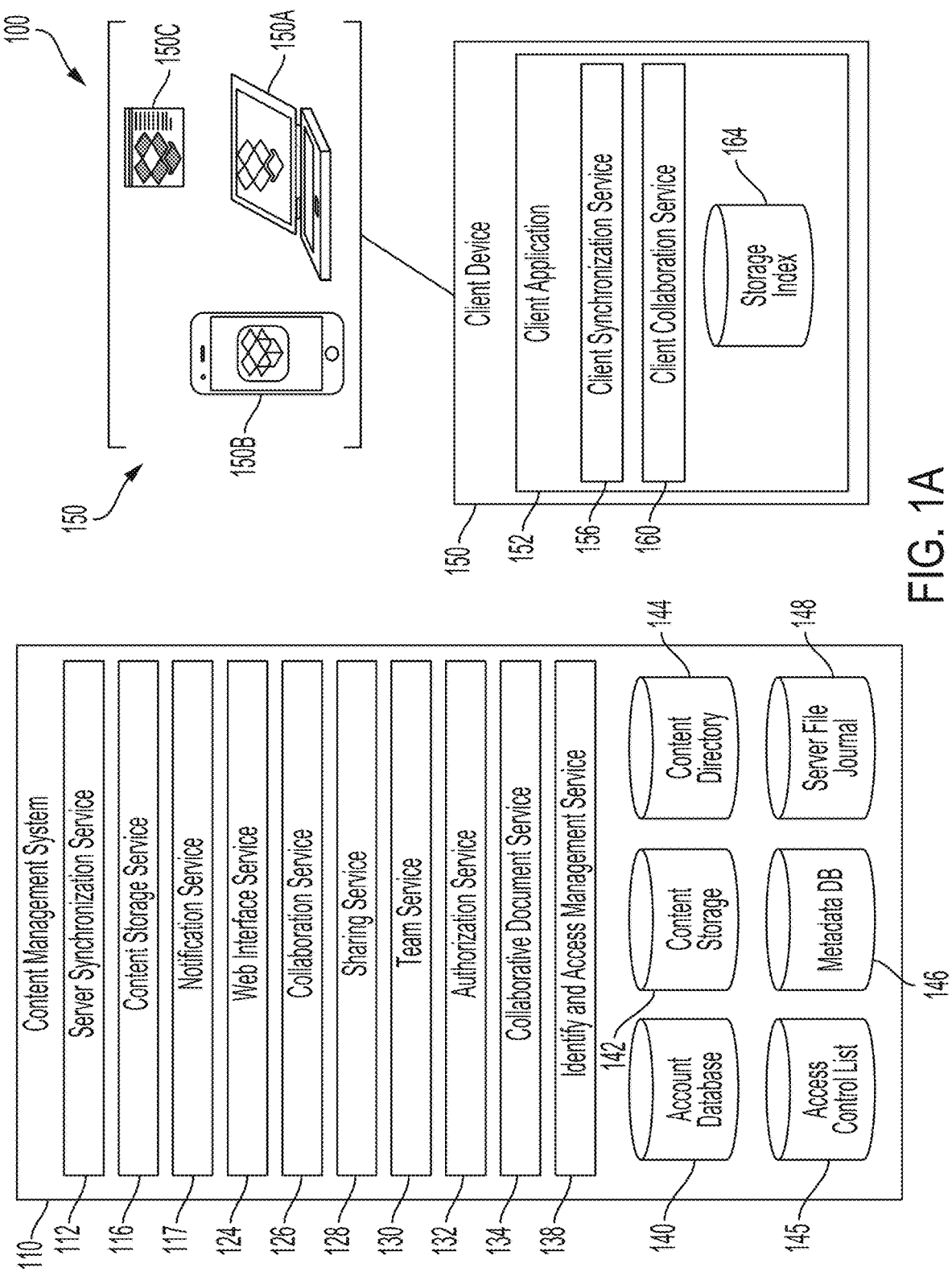
FIG. 1A illustrates an example content management system, in accordance with some embodiments of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Content management systems having an organization or corporate account may comprise teams that manage and group different user accounts based on different functions and roles. However, when user accounts need to be moved from one team to another, transitioning user accounts has remained flawed with both technical and operational obstacles.

To illustrate, a user account that has corporate/enterprise account privileges with respect to a first team may need to return to a personal user account when it is off-boarded from the first team before it can be on-boarded to another team. In doing so, the user may be unintentionally violating terms of employment, by breaching intellectual property clauses and/or inadvertently conducting data theft (company data would be transferred to a personal account outside the company's control). Another way of off-boarding may require the user account to be completely disabled and recreated from scratch on the other team, which may result in loss of data. Furthermore, because off-boarding and on-boarding have traditionally been two separate steps, the user account must reside in an intermediate state (or be deleted) and by doing so, errors with respect to the transfer could arise. For example, when the user account has been off-boarded but prior to being on-boarded to another team, and the number of slots of available members is taken up by another user account, the user account may then be stuck in the intermediate state and there may be a failure to complete the transfer.

The shortage of number of slots may be based on a shortage of licences. With respect to licenses, each member of a team may take up a license associated with the team for team member user accounts. Therefore, when a user account leaves the team, the license previously provided to that user account is freed up such that when another user account joins the team, that license is available for the incoming user account and cannot be transferred to the destination team.

The disclosed technology addresses the need in the art for a team member transfer interface and service, such as for a content management system, that provides a technical solution to the technical problems above as well as others. The team member transfer service may be configured to provide a team member transfer interface to an administrator user as well as provide a mechanism for transferring one or more team member user accounts, such as by switching an assignment of one or more team member user accounts from a first team to another team, such as in a single atomic action. As is described in further detail below, the team member transfer service enables a transfer of the one or more team member user accounts from a first team to another without the need of an intermediate state such that the transfer progresses in a more seamless manner. As a result, the transferring of access and privileges of those transferring team member user accounts is also more seamless and efficient.

Content Management System

In some embodiments the disclosed technology is deployed in the context of a content management system having content item synchronization capabilities and collaboration features, among others. An example system configuration 100 is shown in FIG. 1A, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1A.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150 (150A, 150B, 150C . . . ). Client device(s) can take different forms and have different capabilities. For example, client device 150A is a computing device having a local file system accessible by multiple applications resident thereon. Client device 150B is a computing device wherein content items are only accessible to a specific application or by permission given by the specific application, and the content items are typically stored either in an application specific space or in the cloud. Client device 150C is any client device accessing content management system 110 via a web browser and accessing content items via a web interface. While example client devices 150A, 150B, and 150C are depicted in form factors such as a laptop, mobile device, or web browser, it should be understood that the descriptions thereof are not limited to devices of these example form factors. For example a mobile device such as client device 150B might have a local file system accessible by multiple applications resident thereon, or client device 150B might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content storage service 116. In some embodiments, client synchronization service 156 can perform some functions of content storage service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc. as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110 and access control list database 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notification service 117 when client device 150 is accessing the content item. Notification service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a graphical user interface (GUI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Teams Service

In some embodiments, content management system 110 includes teams service 130. Teams service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders.

Figure 1B:
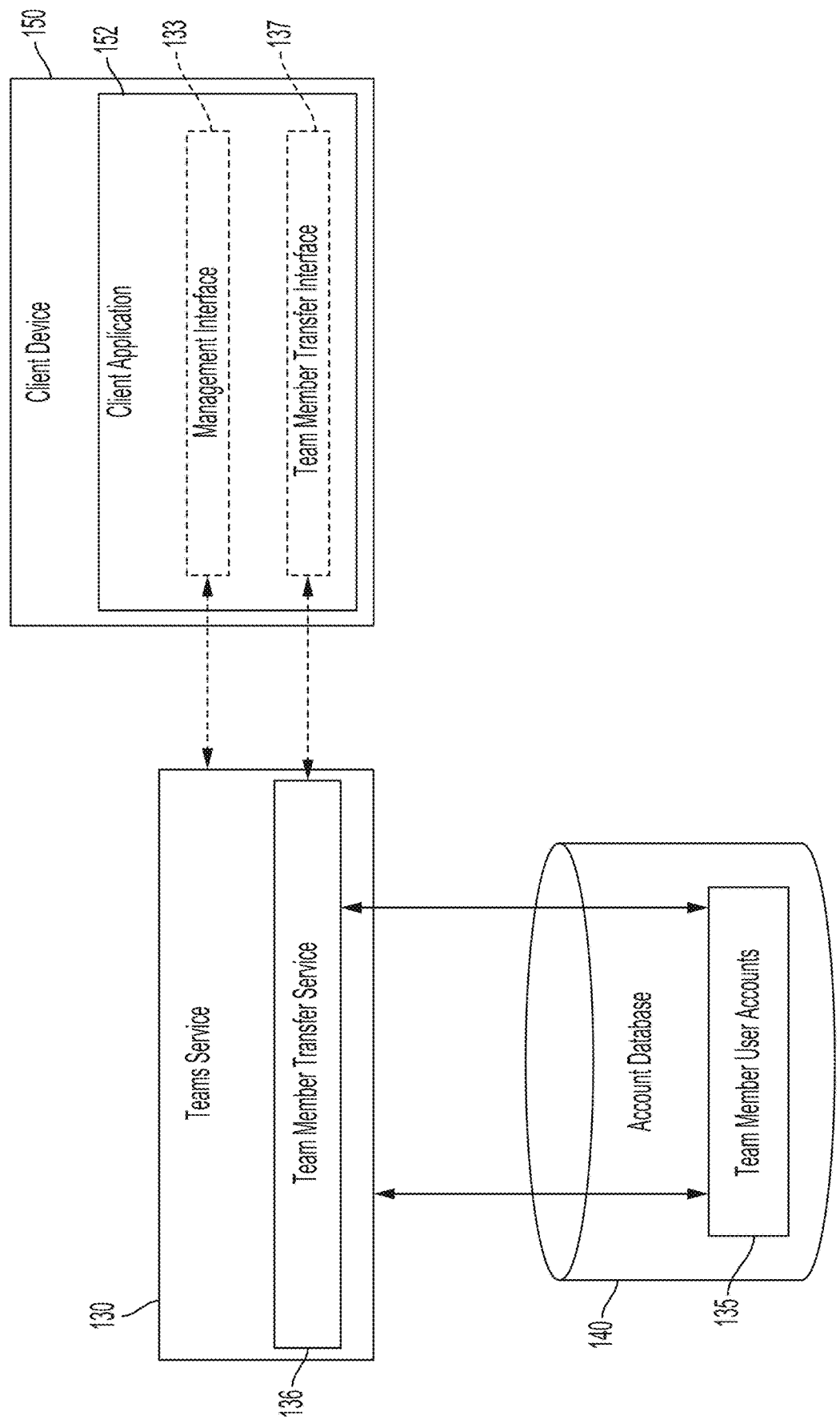
FIG. 1B illustrates an example configuration of teams service controlling aspects of the client application, in accordance with some embodiments of the present technology.

FIG. 1B illustrates an example configuration of teams service 130 controlling aspects of client application 152, in accordance with some embodiments of the present technology. More specifically, teams service 130 may control management interface 133 (see also FIG. 3A) for an administrator user account to manage collections and content items within a team(s), and can manage team member user accounts that are associated with the team(s). Teams service 130 may include team member transfer service 136 which may control team member transfer interface 137 (see also FIGS. 3B-3E).

Figure 2A:
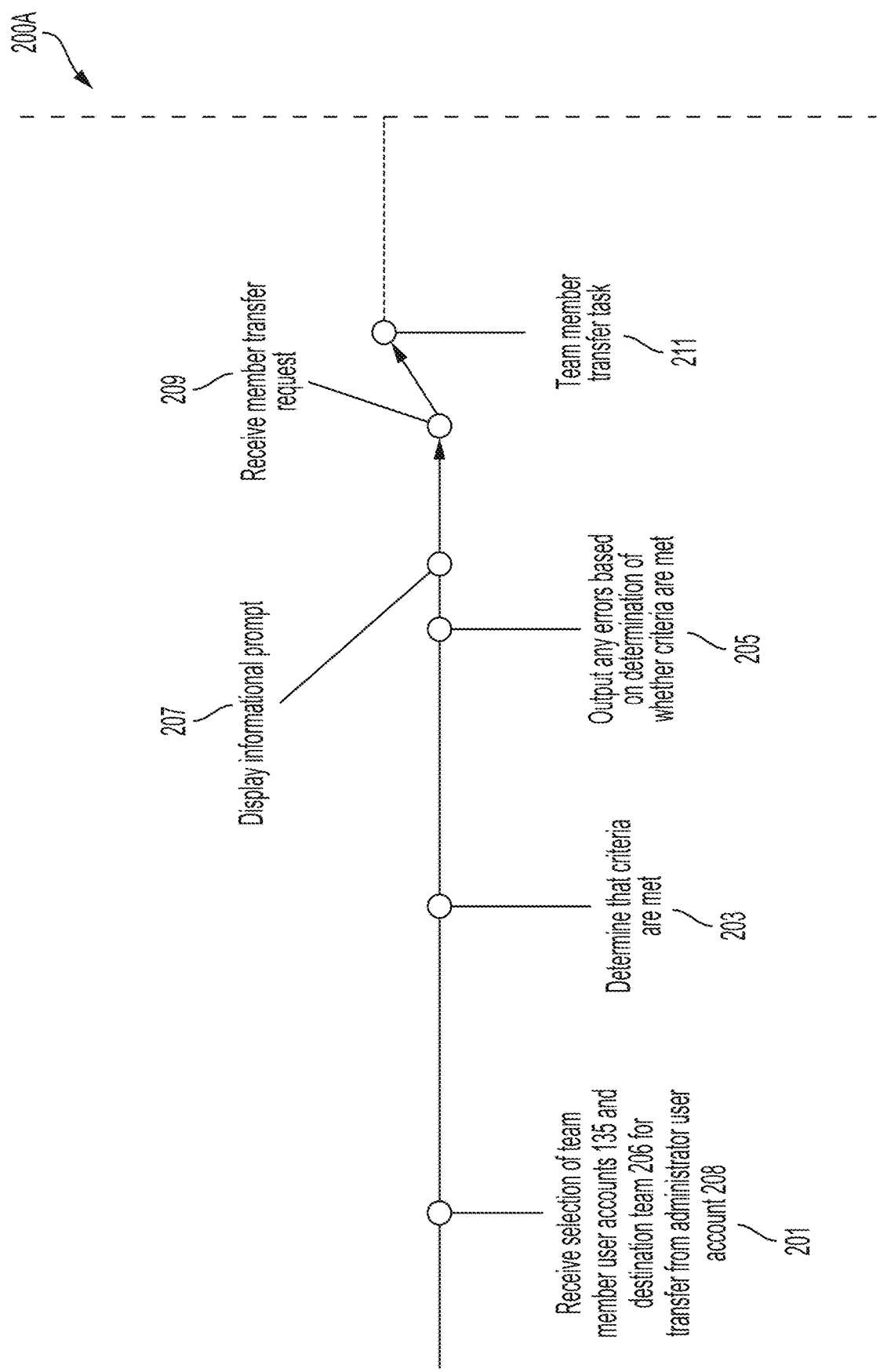
FIG. 2A illustrates a schematic for an example timeline of a team member transfer process, in accordance with some embodiments of the present technology.
Figure 2A:
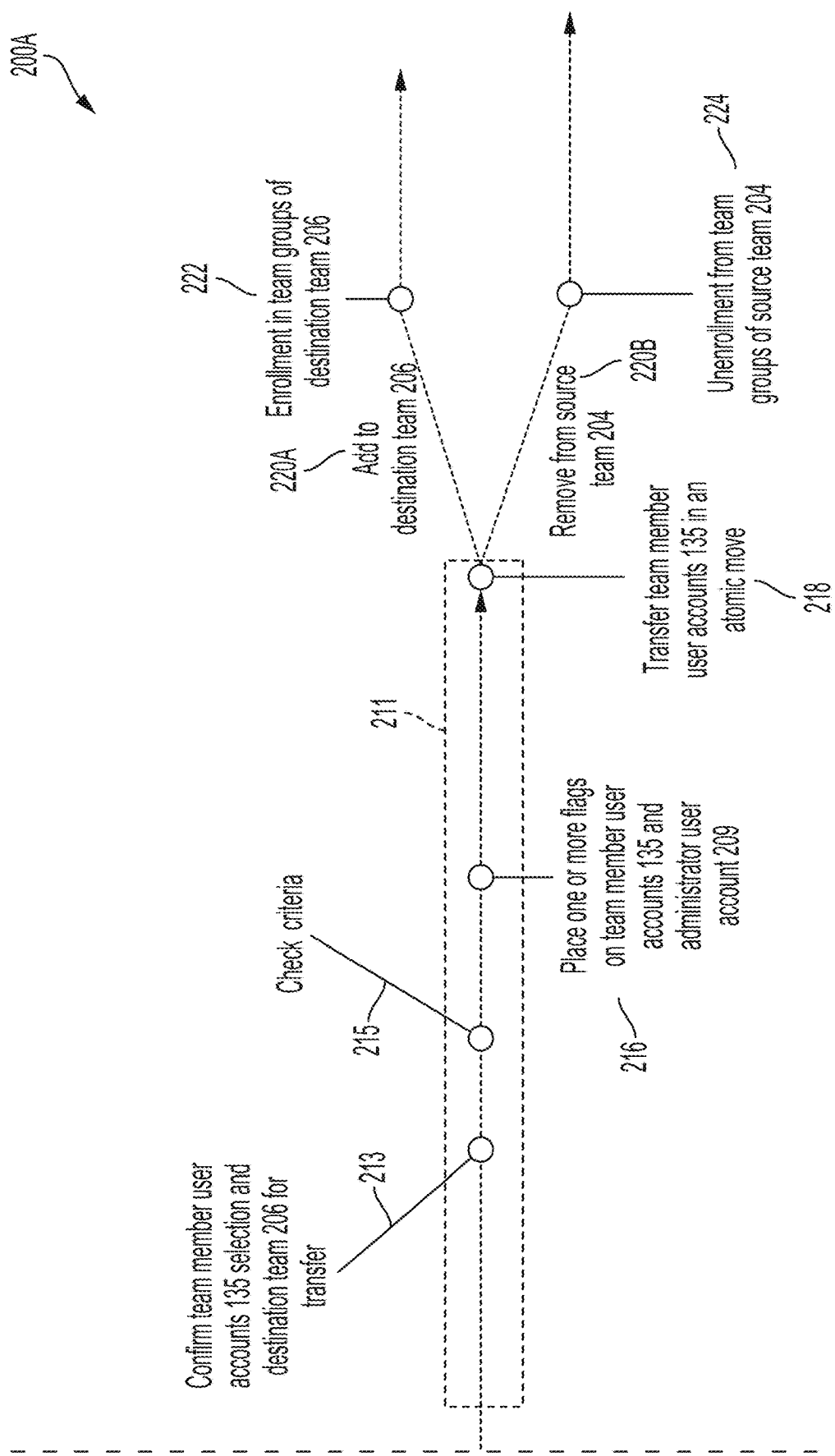

Team member transfer service 136 may be configured to provide functions useful in transferring one or more team member user accounts 135 from the source team to the destination team (see also FIG. 2A). Alternatively, or in addition to, transferring one or more team member user accounts 135, or a part thereof, may be performed by teams service 130. Teams service 130 and/or team member transfer service 136 may communicate with identity and access management (IAM) service 138 with respect to changing access and privileges of team member user accounts in accordance with the transfer. In some embodiments, team member transfer service 136 can be part of IAM service 138.

Identity and Access Management (IAM) Service

IAM service 138 may be a standalone service that owns concepts of users, teams, and groups within the framework of content management system 110. IAM service 138 may provide all or nothing operations to any operation on a user account, a team, or a group, such as creation, deletion, updating, etc. of the identity or access privileges of the respective user account, team, or group. Groups and teams may be distinguishable based on a difference in definition and function. For example, adding user accounts to a team may require changes with permissions to access content items and may be associated with licenses, whereas adding user accounts to groups may be merely a collection of user accounts, such as organizing team member user accounts of a team may be further into groups.

Team Member Transfer Service

In some embodiments, content management system 110 includes team member transfer service 136. Team member transfer service 136 may provide functionality for transferring team member user accounts 135 from one team to another. FIG. 2A illustrates a schematic for an example sequence 200A of a team member transfer process, in accordance with some embodiments of the present technology. With respect to the team member transfer process, a source team may be a first team that team member user accounts 135 should be transferred from, and a destination team may be another team that team member user accounts 135 should be transferred to. In addition, team member user accounts 135 may be one or more team member user accounts. The destination team may be one or more destination teams.

Some preliminary steps may take place prior to team member user accounts 135 transferring in team member transfer task 209. For example, team member transfer interface 137 may display a preliminary determination to help administrator user account 208 determine that certain criteria are not met for a successful transfer with respect to selected team member user accounts 135 and the destination team. For example, team member transfer interface 137 may receive (201) one or more selections of team member user accounts 135 for transfer and a selection of the destination team.

Then, teams service 130 may determine (203) or check that criteria are met before transferring team member user accounts 135. For example, team member transfer service 136 may check whether enough licenses are available at the destination team for all of team member user accounts 135 selected for transfer. Another example may be that team member transfer service 136 may check if administrator user account 208 has qualifying administrative rights to manage the destination team. Being a qualifying administrator may require that administrator user account 208 be a multi-team administrator. Administrative user account 208 may obtain qualifying administrative rights to manage the destination team based on a handshake agreement between the source team and the destination team. The handshake agreement may be a unidirectional agreement that permits administrator user account 208 to act as an administrator of the destination team.

Other criteria that may be checked may include: checking that administrator user account 208 is not attempting to transfer itself; checking that team member user accounts 135 selected for transfer are transferring to teams that administrator user account 208 has qualifying administrative rights to manage; checking that team member user accounts 135 have not been selected to transfer to teams they are already on or to teams that are suspended; preventing team member user accounts 135 selected for transfer from transferring if such team member user accounts 135 are placed on a legal hold (a team member cannot be transferred due to an HR restriction or such team member user accounts 135 have been instructed to preserve electronically stored information); and checking any administrator user account 208 being transferred is not the last administrator on the source team to avoid leaving the source team without an administrator.

Based on the determining (203) of whether the criteria are met, team member transfer interface 137 may output (205) transfer error warnings to administrator user account 208, where the transfer error warnings may indicate what errors may occur if the transfer request is initiated for transfer. See FIGS. 3D-3E and associated disclosure below for more detail. Team member transfer interface 137 might permit administrator user account 208 to still initiate the transfer after outputting the transfer error warnings. Additionally, team member transfer interface 137 may display (207) informational prompt 320 (see FIG. 3F, for example), that provides more information regarding the transfer.

Then, upon receiving (209) the member transfer request, team member transfer service 136 may initiate team member transfer task 211. In some embodiments, to double-check that nothing has changed between receiving (209) the selection and when an input effective to initiate the transfer is received (211), team member transfer service 136 may confirm (213) the identification of selected team member user accounts 135 and of the destination team and check (215) or double-check the criteria with respect to the selection. If the criteria are not met, no team member user accounts are transferred.

Team member transfer task 211 may include a collection of tasks that collectively transfers team member user accounts 135 to the destination team. This collection of tasks may be performed as asynchronous processes, which may proceed in series using a finite state machine to move through the steps in a specific order. Team member transfer task 211 may take place in the background as an asynchronous collection of tasks and may occur in parallel to other actions at content management system 110, including transfers of other team member user accounts received (209) for transfer. However, it will be appreciated by those of ordinary skill in the art that the collection of tasks do not have to run asynchronously.

Once the determination that the criteria are met, team member transfer service 136 or IAM service 138 may place (216) one or more team member transfer flags on team member user accounts 135, the source team, and/or the destination team involved in the transfer. One or more team member transfer flags may be set to both team member user accounts 135 being transferred and administrative user account 208 initiating the transfer. The team member transfer flags may protect against several race conditions. For example, while the team member transfer flag is associated with the team member user accounts 135, the team member transfer flag can prevent team member user accounts 135 from being transferred or off-boarded from other teams of which they are members, from being transferred to any other teams other than the teams part of the pending transfer, or from accepting group invitations from any other teams outside the pending transfer.

Similarly, when applied to administrator user account 208, the team member transfer flag can prevent administrator user account 208 from losing its administrative privileges for as long as administrator user account 208 is flagged. By freezing these user accounts' rights and privileges, content management system 110 is provided time to complete tasks involved in team member transfer task 211, such as tasks to remove the access privileges regarding the source team. Once the tasks involved in team member transfer task 211 are complete, the one or more team member transfer flags may be cleared for each of team member user accounts 135 on a per user account basis. The team member transfer flag for administrator user account 208 may be removed after the transfer job if there are multiple transferring team member user accounts 135.

Then, IAM service 138 may transfer (218) each team member user account 135 from the source team to the destination team in a single atomic action. By doing so, IAM service 138 may switch a team assignment (or team ID) of the team member user account to one associated with the destination team. In some embodiments, IAM service 138 may stage all requested changes for multiple team members temporarily in metadata database 146 and associated databases may be locked so adll requested changes for the multiple team members may be finalized and committed at once in atomic actions for each team member of the multiple team members. In addition, team member transfer service 136 and/or teams service 130 may assist or be in control of the switching of team assignment. In switching or transferring (218) team assignment of team member user accounts 135, IAM service 138 may be adding (220A) team member user accounts 135 to the destination team and removing (220B) team member user accounts from the source team.

Once team member user accounts have been reassigned through the atomic move, changes to access privileges and other actions resulting from the team changes in team assignments may be performed. In some embodiments, changing a team to which a user account is assigned does not, by itself, remove or provide access and privileges that come with team membership.

The change in team assignment will result in enrollment and un-enrollment tasks, where enrollment tasks are necessary actions to give team member user account access and privileges that come with team membership, while un-enrollment tasks result in necessary actions to remove access and privileges. The enrollment and un-enrollment tasks may be separate asynchronous tasks for changing enrollment in team groups. Adding (220A) team member user accounts 135 to the destination team may cause enrollment (222) of the team member user accounts 135 to certain team groups associated with the destination team. Removing (220B) team member user accounts 135 from the source team may cause un-enrollment (224) of the team member user accounts 135 from certain team groups associated with the source team.

For example, for each team, when a new team member joins, by default, the new team member may be added to at least a team group that includes everyone on the team. In addition, the user account may be added to an access control list for content items shared among members of the team. Additionally, a team member might have privileges to share content items, or have other rights. When the team member is removed from the team group the user is included in the team membership, and is removed from the access control list for content items shared among members of the team, and will have privileges removed.

In some embodiments, an administrator can allow a user account to retain a copy of content items from the team in which the user account is being removed. However, if the source team does not permit shared folders from being shared outside the source team, administrator user account 208 may not be allowed to override such a decision, and the user will lose access to any content items to which the user account has access by virtue of team membership.

Any content items to which the user account has access through their personal namespace associated with their user account can be retained after the user account has transferred teams. The home namespaces may include content items and data associated therewith that are tied directly to the user account itself. In the event that transferring the user account to a new destination team requires unmounting the user account namespace from a current organization directory and mounting it in a new organization directory (such as when a user is being reassigned to a new subsidiary within a larger organization), un-enrollment tasks and enrollment tasks can also include the unmounting and mounting of the user account namespace.

Figure 2B:
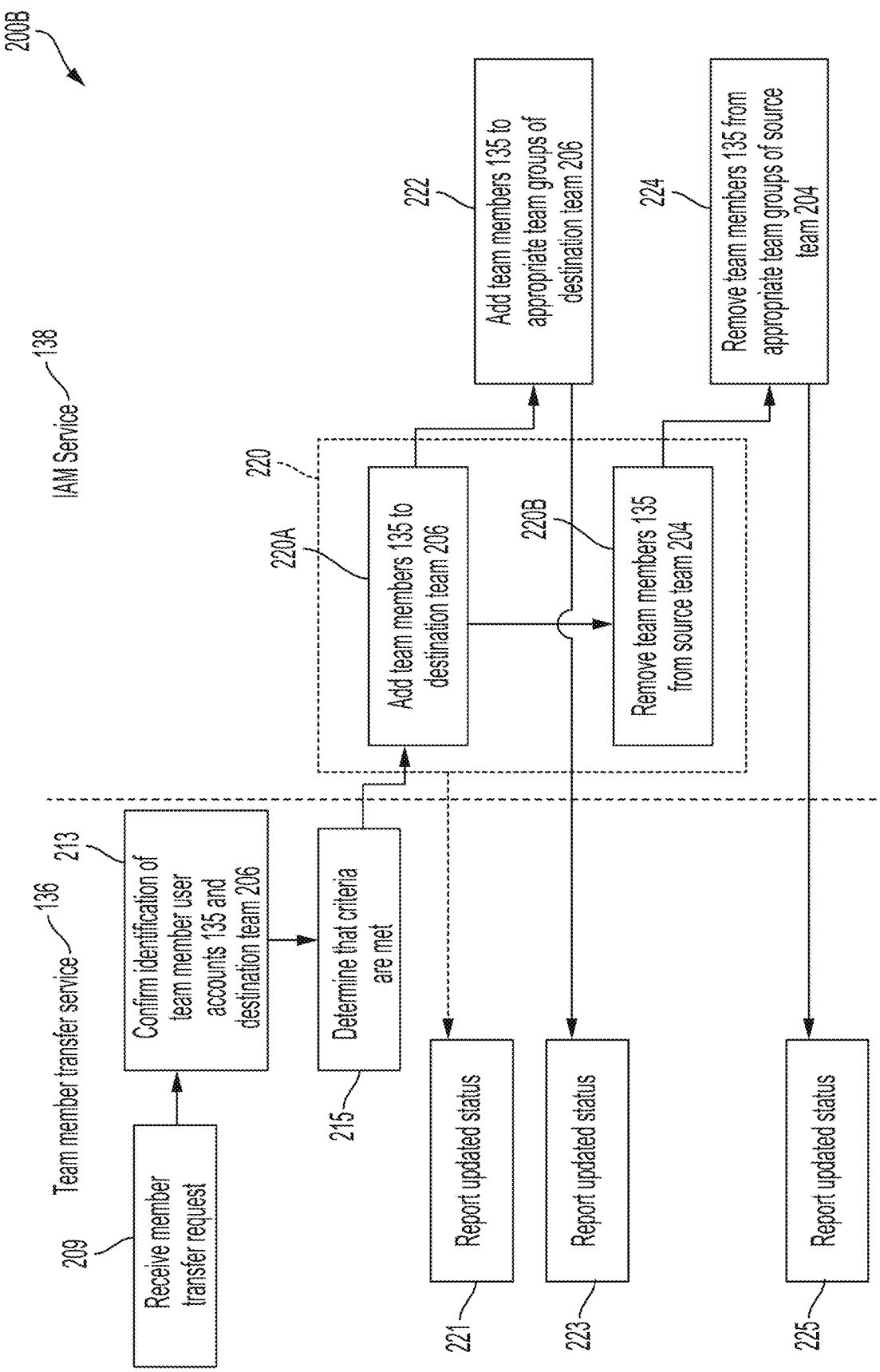
FIG. 2B illustrates a flowchart of the team member transfer process, in accordance with some embodiments of the present technology.

FIG. 2B shows an example flowchart 200B of the team member transfer process, in accordance with some embodiments of the present technology. While FIG. 2B shows particular services within content management system 110 performing certain steps, the steps are not required to be performed explicitly by the illustrated services as shown and are merely examples of how particular services may perform particular steps.

Team member transfer service may receive (209) a member transfer request, which may have been inputted by administrator user account 208 at team member transfer interface 137. After receiving (209) the member transfer request, team member transfer service 136 may confirm (213) an identification of at least one team member user account and an identification of the destination team that was received by team member transfer service 136.

Team member transfer service 136 may determine (215) that criteria are met, where the criteria is to determine whether a team member, administrator, source team, destination team, or a combination thereof is eligible to be included in the transfer request. Team member transfer service 136 may add (220A) team member user accounts identified in the transfer request to the destination team and remove (220B) team member user accounts identified in the transfer request from the source team in a single atomic action for each user account. More specifically, account database 140 includes records of team member user accounts 135 that associate user accounts to team membership(s). The membership on a team by a user account can be changed, overwriting a previous association to a team for the user account with a new association to a new team for the user account.

Once team member user accounts identified in the transfer request are successfully switched, team member transfer service 136 may report (221) an updated status.

The removing (220B) and adding (220A) of a user account from/to a team may not, by itself, change access and privileges that come with membership on a team. Some of these changes in access and privileges are performed in additional processes. For example, IAM service 138 may add (222) team member user accounts identified in the transfer request to appropriate team groups of the destination team for adding access and privileges associated with the destination team. Once team member user accounts identified in the transfer request are successfully added to the appropriate team groups, team member transfer service 136 may report (223) an updated status. Additionally, IAM service may remove (224) team member user accounts identified in the transfer request from appropriate team groups of the source team. Once the team member user accounts identified in the transfer request are successfully removed from the appropriate team groups, team member transfer service 136 may report (225) an updated status, such as by providing notification data for team member transfer interface 137 to display.

FIGS. 3B, 3C, 3D, 3E, and 3F illustrate example graphical user interfaces of team member transfer interface 137 accessible by an administrator user account.

Figure 3A:
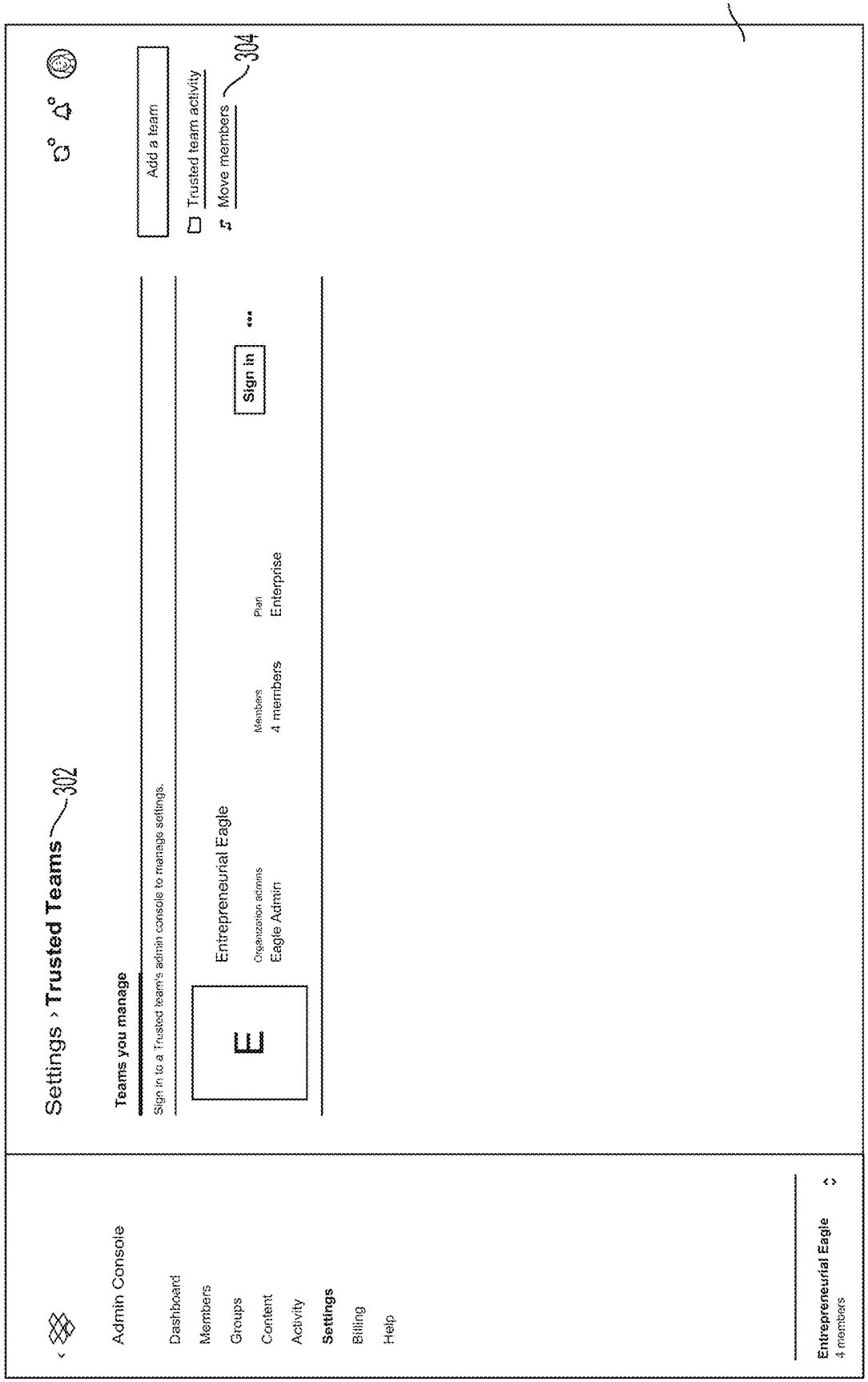
FIG. 3A illustrates an example graphical user interface of a management interface, in accordance with some embodiments of the present technology.

FIG. 3A illustrates an example graphical user interface of management interface 133 for administrator user account 208. Management interface 133 can present a list of teams that administrator user account 208 manages, stated in "Trusted Teams" page 302. In "Trusted Teams" page, for each team, "Move members" interface element 304 can be engaged to move members on teams that administrator user account 208 manages.

Figure 3B:
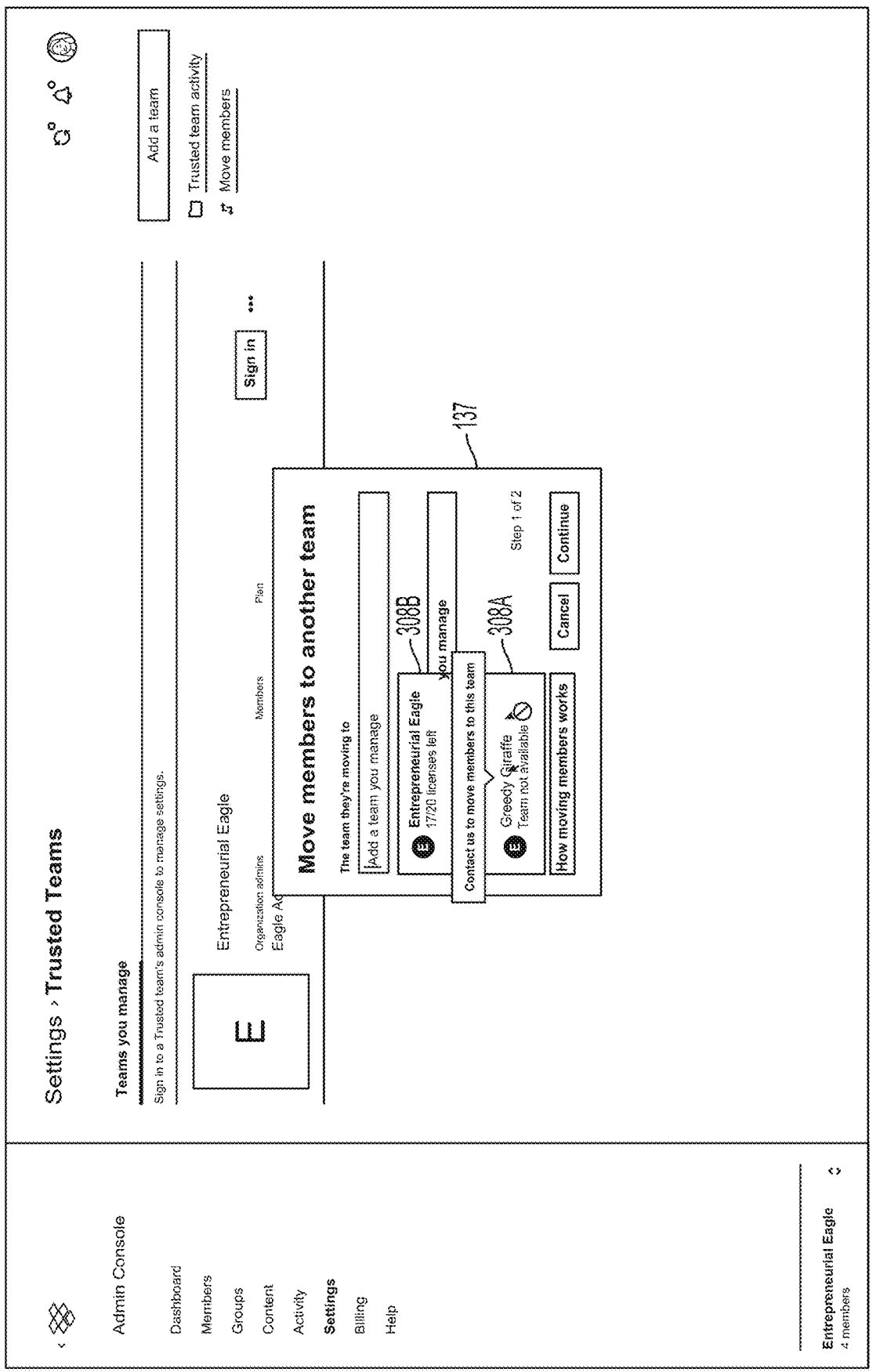
FIG. 3B illustrates an example graphical user interface of a team member transfer interface, in accordance with some embodiments of the present technology.
Figure 3C:
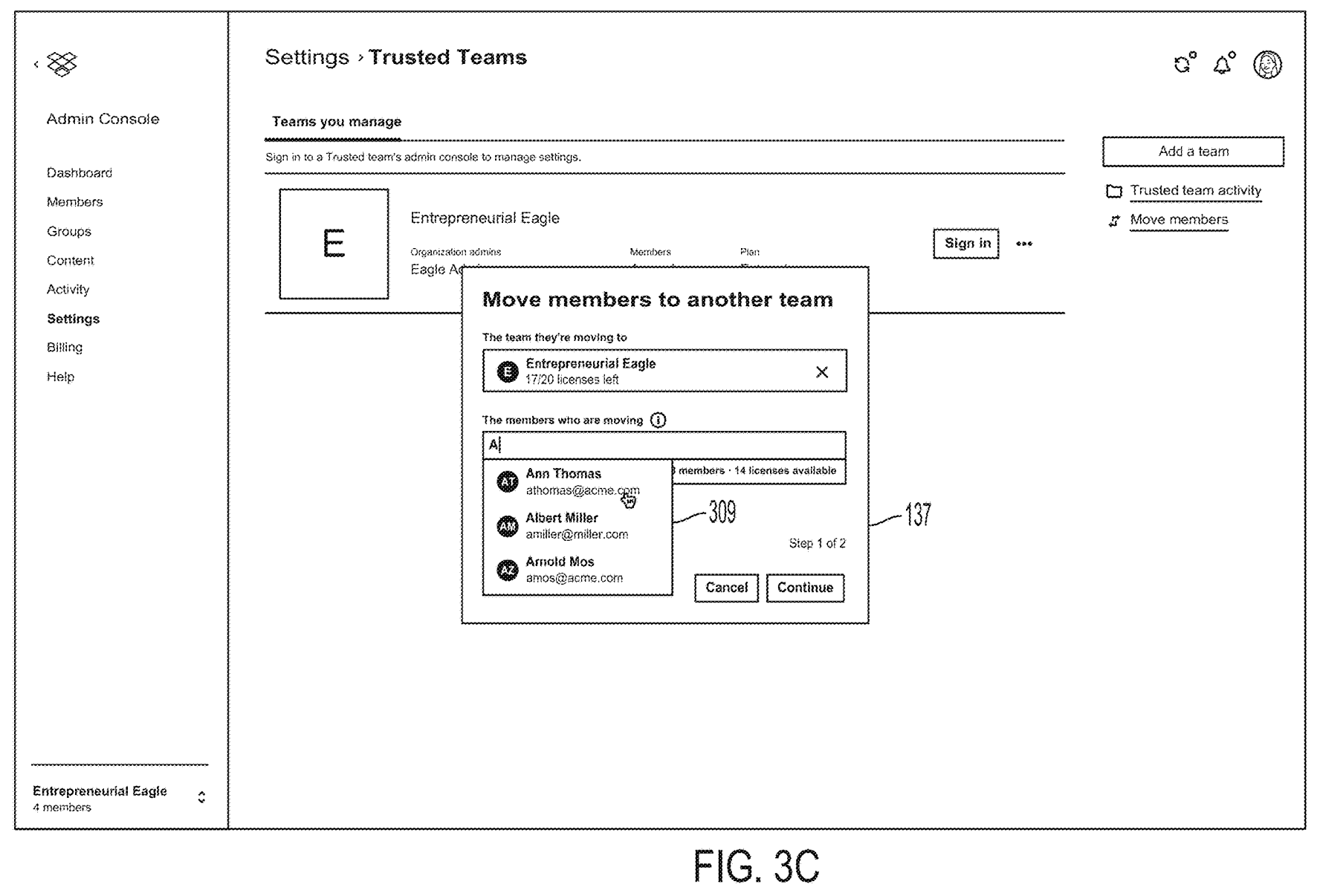
Figures 3D, 3E:
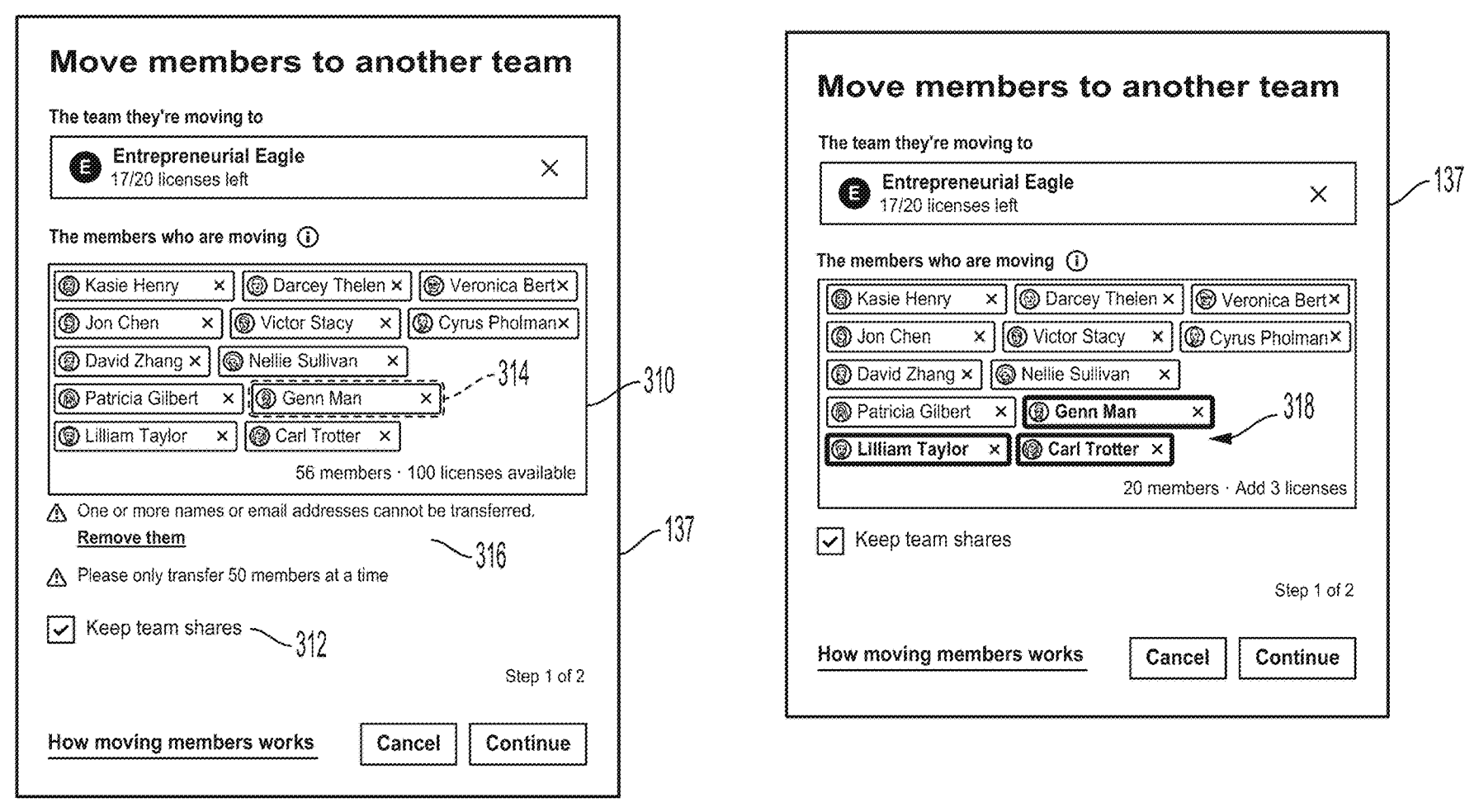

As shown in FIGS. 3B, 3C, and 3D, team member transfer interface 137 may provide various interactive elements, such as text entry fields or drop-down menus, for transferring selected team member user accounts to another team. More specifically, team member transfer interface 137 may provide for first interactive element 308A for selecting the destination team. Certain teams, such as "Greedy Giraffe" shown in FIG. 3B, may be pre-determined to be not available as the destination team. An available team, such as "Entrepreneurial Eagle" shown in FIG. 3B may be selected by administrator user account 208, in accordance with some embodiments. Team member transfer interface 137 may also provide second interactive element 309 for selecting which team member from the source team are to be transferred, as shown in FIG. 3C.

Team member transfer interface 137 may also receive (201) selection of team member user accounts 135 from the source team for transfer via third interface element 310, a text-entry field as shown in FIGS. 3D and 3E. Further, team member transfer interface 137 may output (205) errors 314, 316, 318, when certain team member user accounts are selected for transfer but member transfer request is not yet submitted. For example, team member transfer interface 137 may highlight a potential error, such as via error 314 as shown as a highlighted box in FIG. 3D with respect to team member "Robert H.", indicating that there is an issue with respect to that team member. An error with respect to the transfer may also be indicated as error messages 316, such as indicating that a certain number of member user accounts have been selected for transfer that surpasses a supportable limit. Another example of outputting (205) errors 314, 316, 318 may include indicating there is an insufficient number of licenses available at the destination team. For example, error 318 is indicated as highlighting text for the last three users that would not have successfully transferred in FIG. 3E. Consequently, three licenses must be added before a successful transfer may occur.

FIG. 3F illustrates an example graphical user interface of team member transfer interface 137 displaying (207) informational prompt 320, in accordance with some embodiments of the present technology. Informational prompt 320 may include warnings and instructions that administrator user account 208 may need to be aware of with respect to the transfer.

Figure 4A:
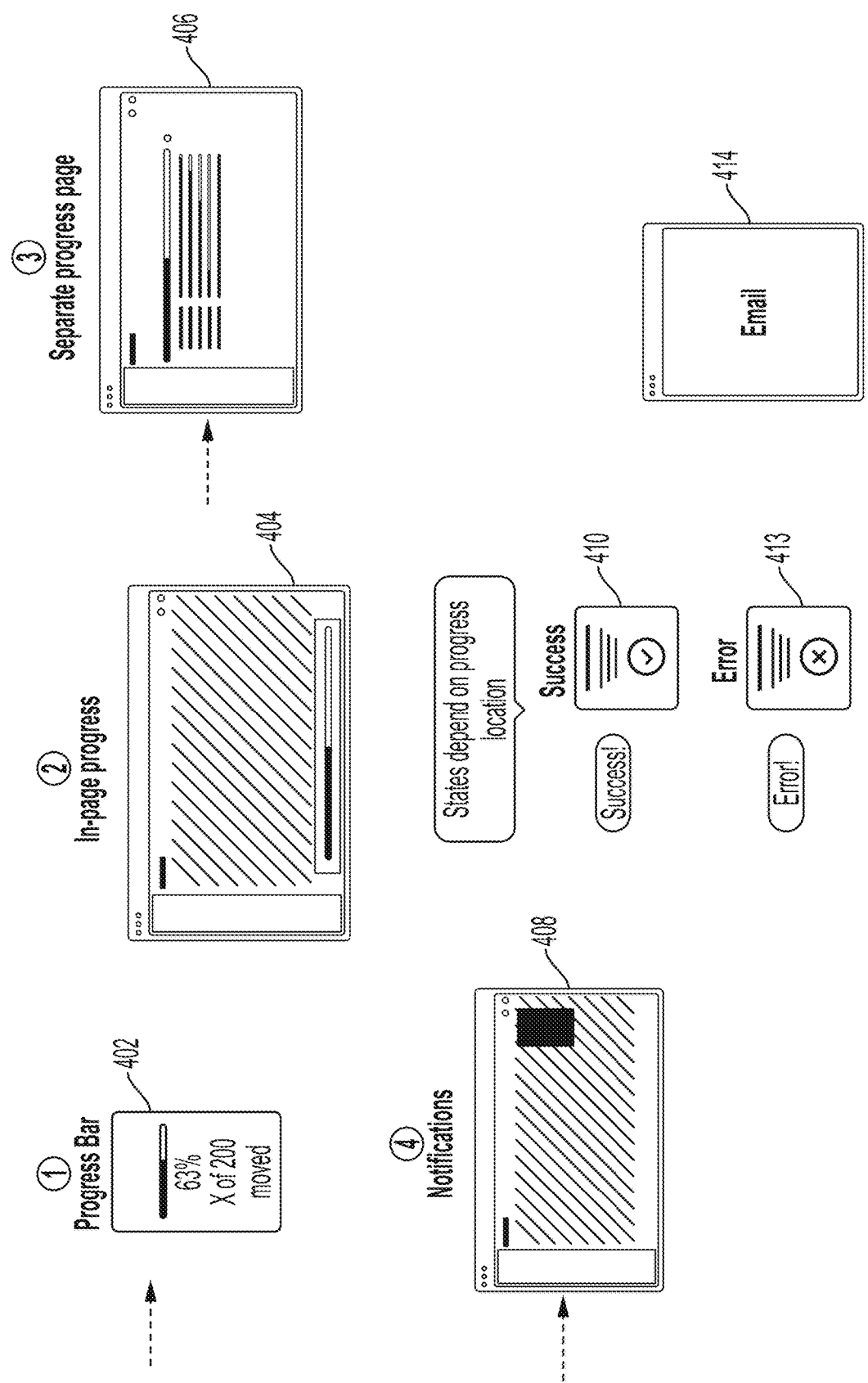
FIG. 4A illustrates examples of different schematics for notification and progress reports with respect to a status of completion intervals for the transfer of team member user accounts, in accordance with some embodiments of the present technology.
Figure 4C:
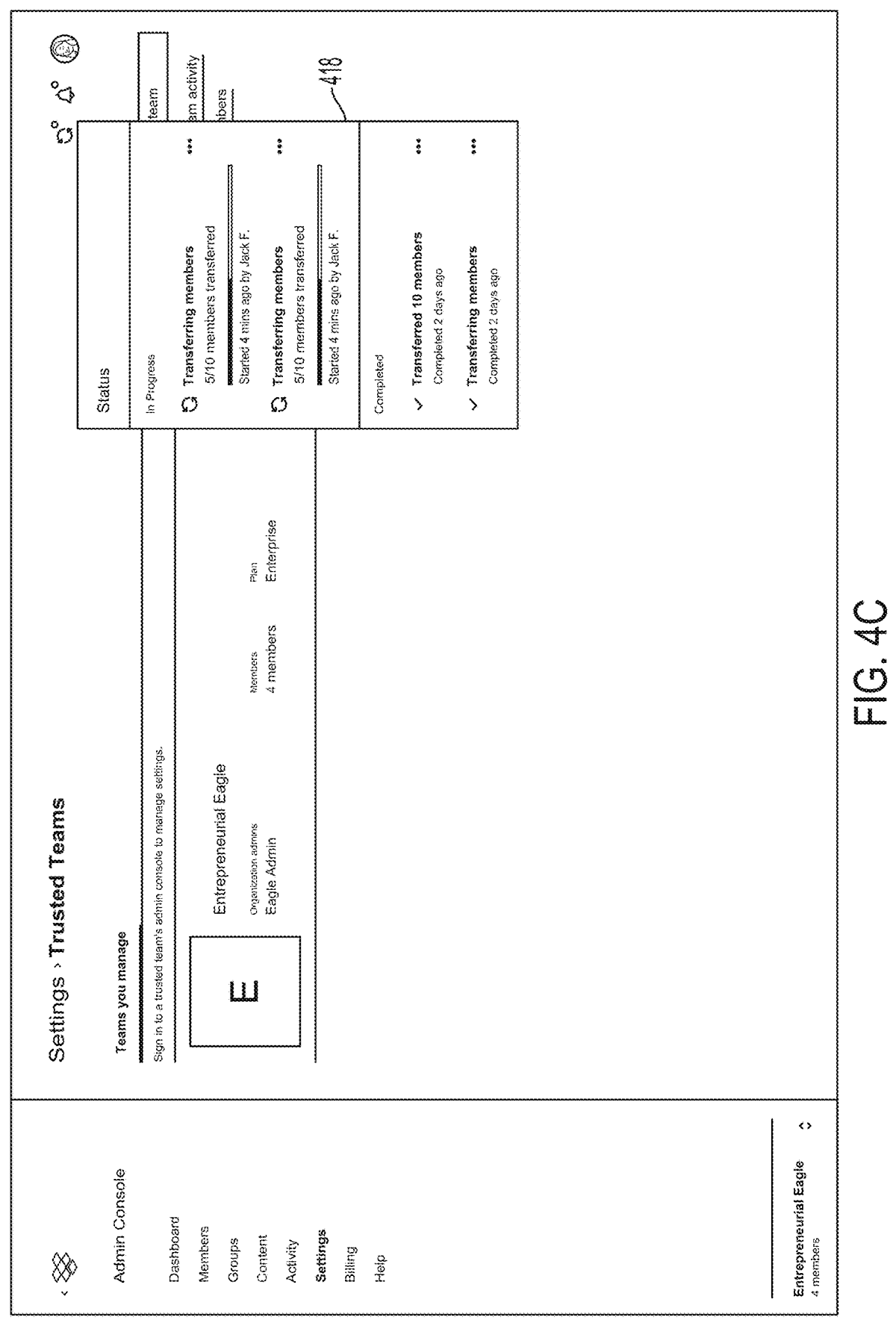
Figure 4D:
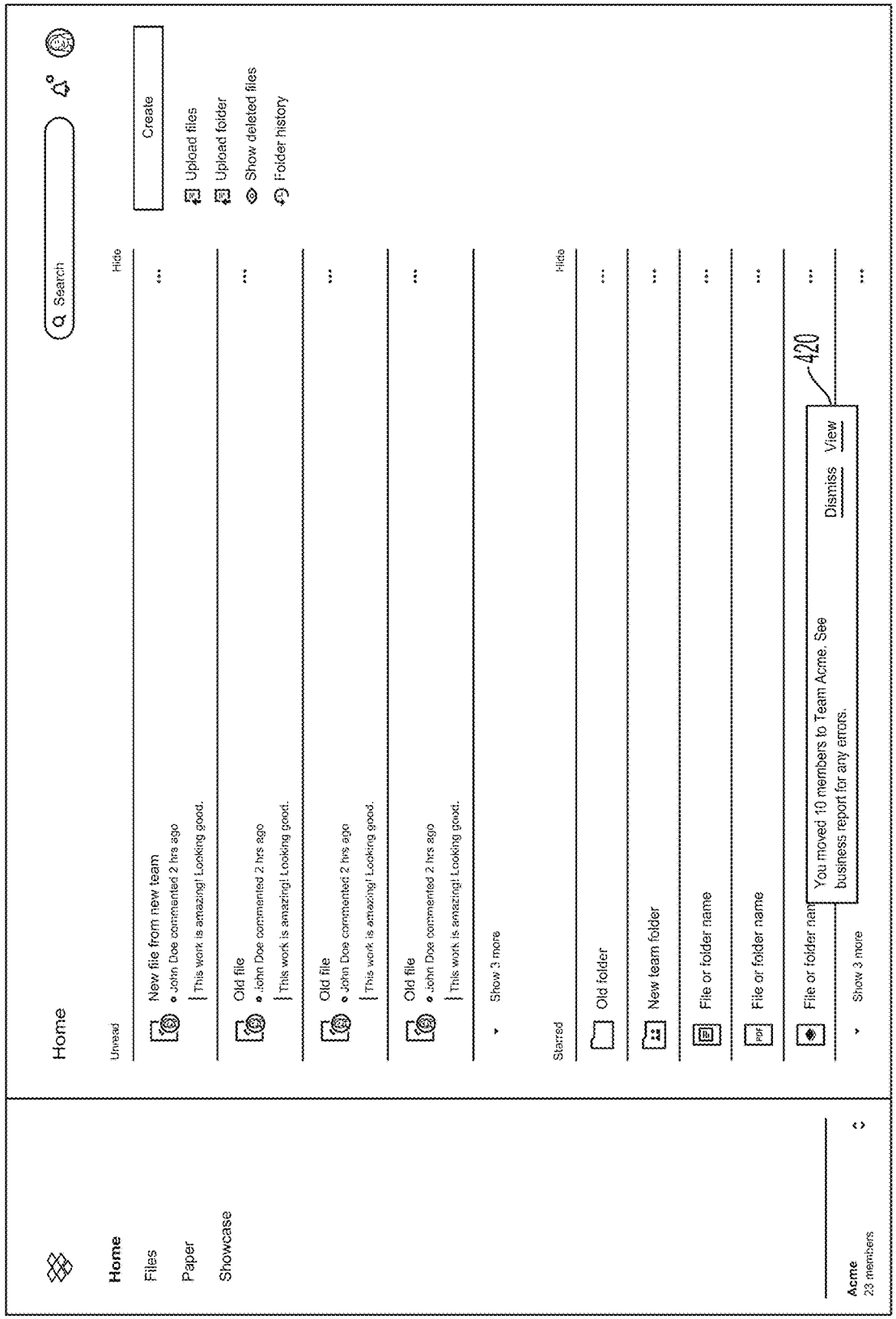
FIG. 4D illustrates an example of notification and progress reporting with respect to the transfer of the team member user accounts, in accordance with some embodiments of the present technology.

FIG. 4A illustrates examples of different schematics for notification and progress reports regarding status of completion intervals 215 for transferring team member user accounts 135, in accordance with some embodiments of the present technology. While the tasks in the team member transfer process are being performed, team member user accounts 135 and/or administrator user account 208 may be informed of the status of transfer. The status may be translated into notifications, status updates or reports, or other forms of reporting. Status updates or reports may include when team member user accounts 135 have been removed from the groups and/or team groups that team member user accounts 135 were given access to. For example, the status report may be shown as progress bar 402, in-page progress 404, separate progress page 406, emails 414, and notifications 408 such as via notification tray 418 as shown in FIG. 4C or as banners 412, 420 as shown in FIGS. 4B and 4D. The progress may also indicate what team member user accounts 135 is still allowed to do and what access and privileges they may still have at certain points in the transfer. Additionally, success and failures of completion intervals 215 may also be shown as notifications 410, 413. These updates may also be accessible to other administrators privy to such information, such as ones that belong to the same enterprise or corporate account, to provide more insight regarding the movement of user accounts.

Figure 5A:
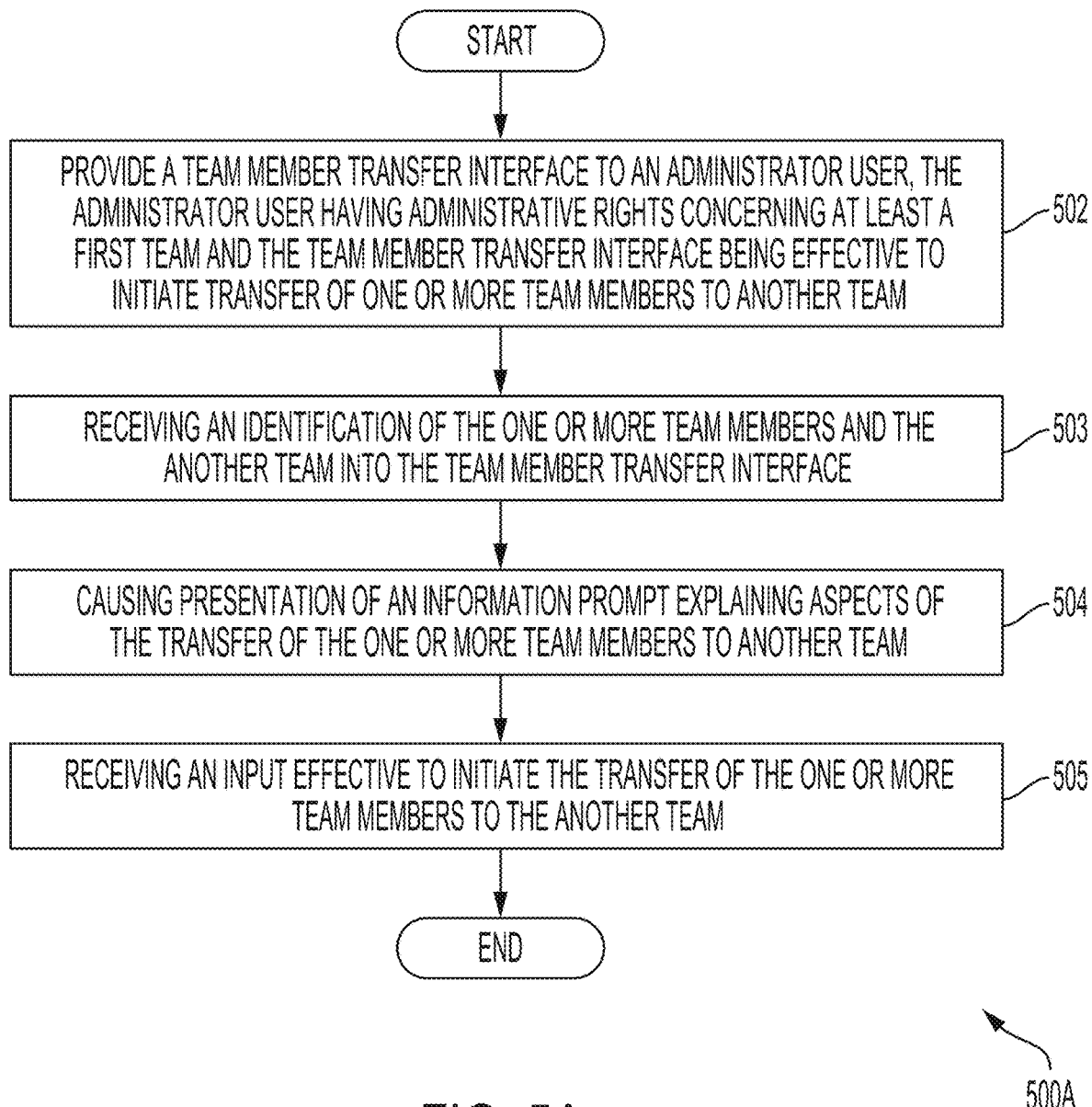
FIG. 5A illustrates a flowchart of an example method for transferring team member user accounts from one team to another, in accordance with some embodiments of the present technology.
Figure 5B:
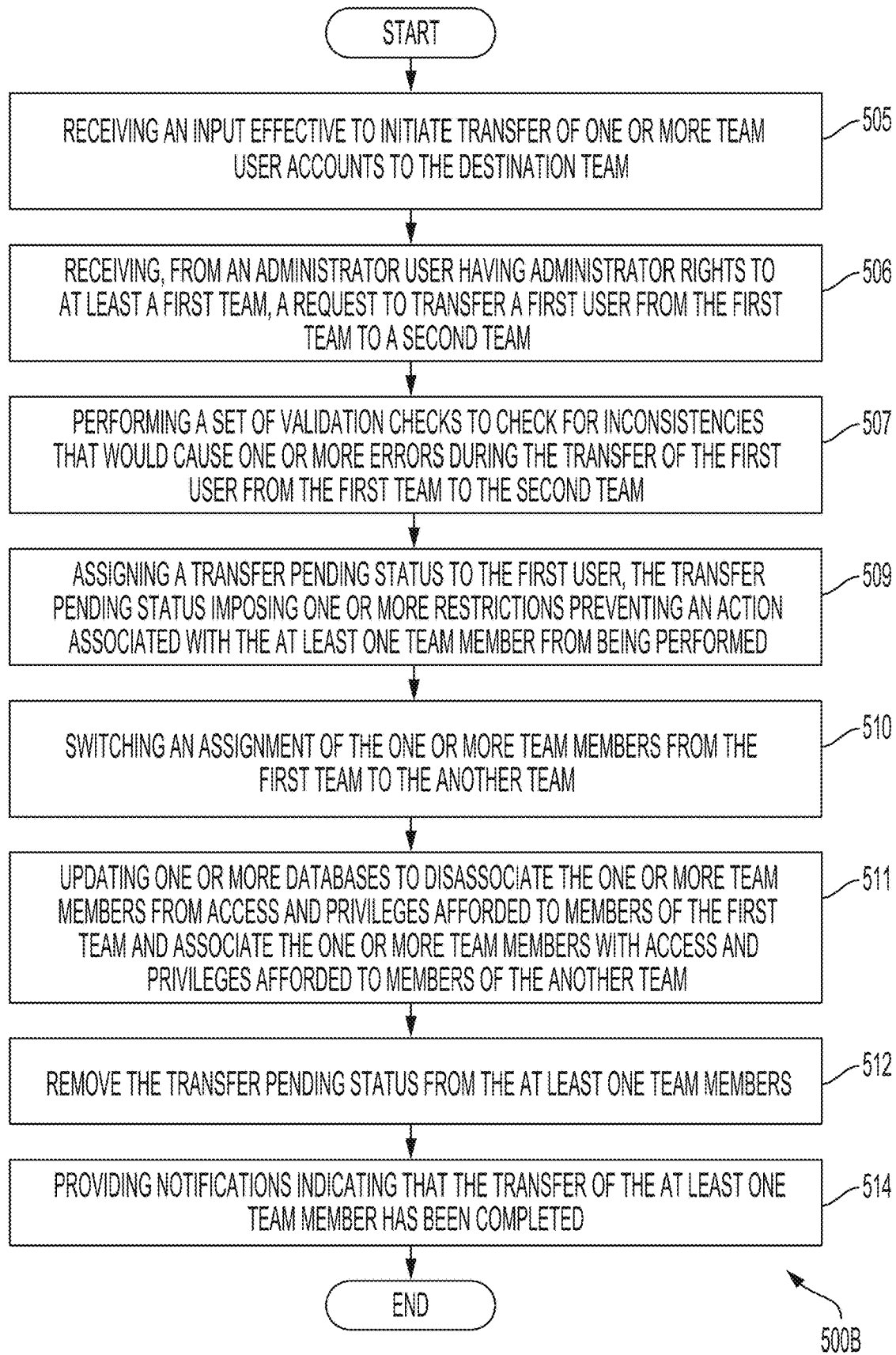
FIG. 5B illustrates a flowchart of another example method for transferring team member user accounts from one team to another, in accordance with some embodiments of the present technology.

FIGS. 5A and 5B are flowcharts of example method 500A and 500B for transferring team member user accounts 135 from one team to another, in accordance with some embodiments of the present technology. Although the example methods depict a particular sequence of operations, the sequence may be altered without departing from the spirit of the present disclosure. For example, some operations depicted may be performed in parallel or in a different sequence that does not materially affect the function of the methods. In other examples, different components of an example device or system that implements the methods may perform functions at substantially the same time or in a specific sequence.

In some embodiments, methods 500A, 500B may include providing (502) team member transfer interface 137 to an administrator user account of at least a first team (the source team). Team member transfer interface 137 may be effective to initiate the transfer of one or more team member user accounts to another team (e.g., a destination team). In some embodiments, the administrator user account may have administrative rights to the first team and the destination team. For example, team member transfer service 136 may control team member transfer interface 137 provided at client application 152.

The method may include receiving (503) an identification of one or more team member user accounts and the destination team into team member transfer interface 137. For example, team member transfer service 136, as illustrated in FIG. 1B, or team member transfer interface 137, as illustrated in FIGS. 3B-3E, may be effective to receive (503) an identification of one or more team member user accounts and the destination team which to associate the one or more team member user accounts via client application 152.

In some embodiments, team member transfer interface 137 may include interface element 312 effective to allow the administrator user account to specify whether one or more team member user accounts should retain access to shared content items shared with one or more team member user accounts after the transfer. The shared content items may be shared with one or more team member user accounts by virtue of being a member of the first team.

In some embodiments, the administrator user account may be required to have administrative rights concerning the destination team to initiate the transfer, e.g. the administrator user account has administrative rights, at least sufficient to make membership assignments, to both the source and destination team.

In some embodiments, method 500 may include presenting (504) informational prompt 320 that explains aspects of the transfer of one or more team member user accounts to the destination team. For example, team member transfer interface 137 may be effective to present (504) informational prompt 320. In some embodiments, method 500 may include receiving (505) an input effective to initiate the transfer of one or more team member user accounts to the destination team. For example, team member transfer service 136, as illustrated in FIG. 1B, or team member transfer interface 137, as illustrated in FIGS. 3B-3E, may be effective to receive (505) the input effective to initiate the transfer of one or more team member user accounts to the destination team.

In some embodiments, the method 500 may include receiving (506), from administrator user account, having administrator rights to at least a first team (or the source team), a request to transfer or one or more team member user accounts from the first team to a second team (or the destination team). For example, team member transfer service 136, as illustrated in FIG. 1B, or team member transfer interface 137, as illustrated in FIGS. 3B-3E, may be effective to receive (506) the request to transfer one or more team member user accounts from the first team to a destination team.

In some embodiments, method 500 may include performing (507) a set of validation checks to check for inconsistences that would cause one or more errors during the transfer of one or more team member user accounts from the first team to the destination team. The set of validation checks may be preemptive checks performed before the request for transfer is received or as final checks after the request for transfer is received. The set of validation checks may include checking if a sufficient number of licenses are available for one or more team member user accounts 135 to join the destination team. For example, team member transfer service 136, as illustrated in FIG. 1B, and/or team member transfer interface 137, as illustrated in FIGS. 3B-3E, may be effective to perform (507) the set of validation checks to check for inconsistencies.

In some embodiments, method 500 may include assigning (509) a transfer pending status to one or more team member user accounts, based on a determination that one or more team member user accounts is allowed to be transferred from the first team to the destination team. The transfer pending status may impose at least one restriction preventing an action associated with one or more team member user accounts from being performed. For example, team member transfer service 136 or IAM service 138, as illustrated in FIG. 1B, and/or team member transfer interface 137, as illustrated in FIGS. 3B-3E, may be effective to assign (509) a transfer pending status to one or more team member user accounts.

In some embodiments, the method 500 includes switching (510) an assignment of one or more team member user accounts from the first team to the destination team. Furthermore, the switching of the assignment of one or more team member user accounts 135 from the first team to the destination team may occur in a single atomic action. For example, IAM service 138, as illustrated in FIG. 2B, may be effective to switch (510) the assignment of one or more team member user accounts 135 from the first team to the destination team. Team member transfer service 136 and/or team member transfer interface 137 may also be effective to switch the assignment.

In some embodiments, the method 500 includes, after switching (510) the assignment of one or more team member user accounts 135 from the first team to the destination team, updating (511) one or more databases to disassociate one or more team member user accounts 135 from access and privileges afforded to members of the first team, and to associate one or more team member user accounts 135 with access and privileges afforded to members of the destination team. The disassociation of one or more team member user accounts from access and privileges may result in restricting access to documents associated with the first team, groups associated with the first team, or applications associated with the first team. For example, IAM service 138, as illustrated in FIG. 2B, may be effective to update (511) one or more databases to disassociate one or more team member user accounts from access and privileges afforded to members of the first team, and to associate one or more team member user accounts with access and privileges afforded to members of the destination team.

Also after switching (510) the assignment, the transfer pending status may be removed (512) from one or more team member user accounts. Team member transfer service 136 or IAM service 138, as illustrated in FIG. 1B, and/or team member transfer interface 137, as illustrated in FIGS. 3B-3E, may be effective to remove (512) the transfer pending status. Additionally, the method may include, providing (514) a transfer status progress indicator regarding the progress of the transfer, one or more notifications reporting status of one or more completion intervals of the transfer, and/or a separate progress page showing real-time progress of the transfer. For example, teams service 130, team member transfer service 136, or IAM service 138, as illustrated in FIGS. 1A-2B, may be effective to provide a transfer status progress indicator regarding the process of the transfer.

Figure 6:
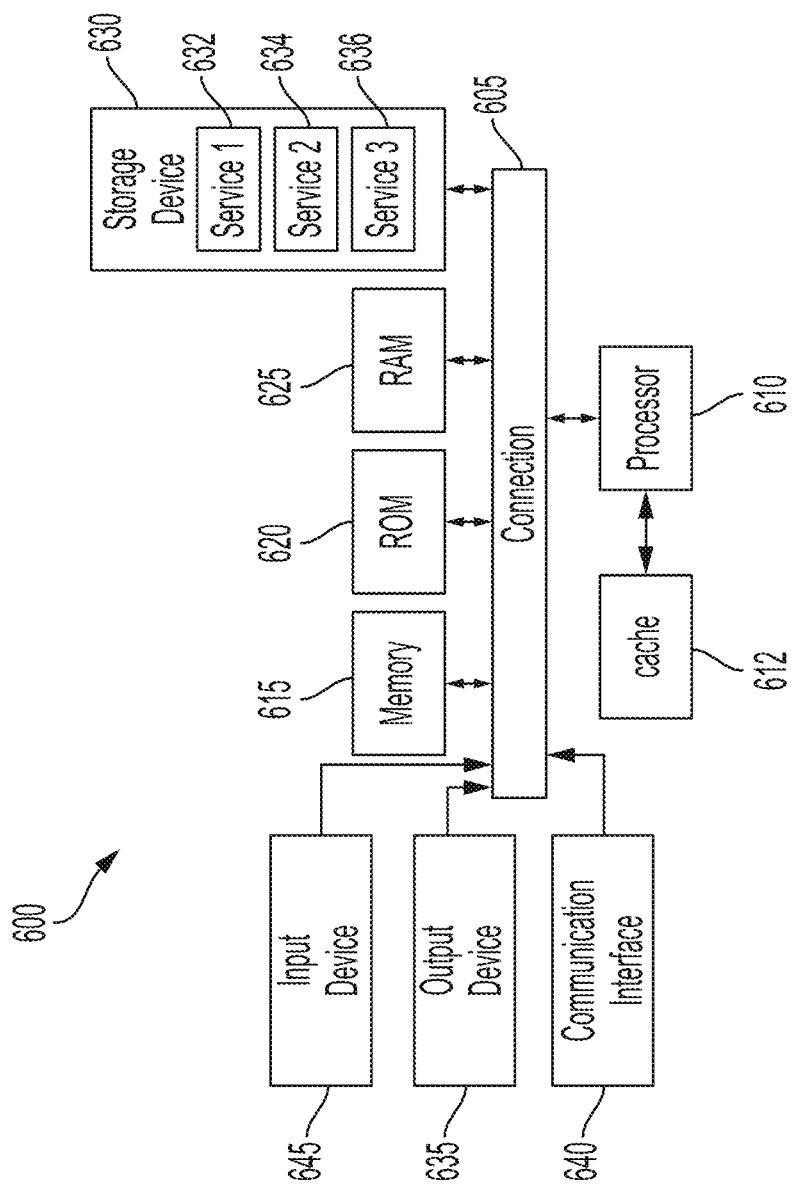
FIG. 6 shows an example of a system for implementing various aspects of the present technology.

FIG. 6 shows an example of computing system 600, which can be, for example, any computing device making up client device 150, content management system 110, activity feed service 136 or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
  receiving, from an administrator user having administrator rights to at least a first team, a request to transfer one or more team member user accounts from the first team to a destination team;
  performing a set of validation checks to check for inconsistences that would cause one or more errors during a transfer of the one or more team member user accounts from the first team to the destination team;
  assigning a transfer pending status to the one or more team member user accounts, the transfer pending status imposing one or more restrictions preventing an action associated with the one or more team member user accounts from being performed;
  switching an assignment of the one or more team member user accounts from the first team to the destination team in a single atomic action that includes adding the one or more team member user accounts to the destination team and removing the one or more team member user accounts from the first team; and
  removing the transfer pending status from the one or more team member user accounts.

2. The method of claim 1, wherein the set of validation checks include checking if sufficient number of licenses are available for the one or more team member user accounts to join the destination team.

3. The method of claim 1, wherein the set of validation checks are preemptive and performed before an input effective to initiate the transfer is received, and the administrator user is notified of any preemptive errors in an team member transfer interface.

4. The method of claim 1, wherein the assigning is based on a determination that the one or more team member user accounts is allowed to be transferred from the first team to the destination team, and wherein the removing the transfer pending status is after completing the transfer of the one or more team member user accounts to the destination team.

5. The method of claim 1, further comprising:
  during the transfer of the one or more team member user accounts to the destination team, providing at least one of:
    a transfer status progress indicator regarding a process of the transfer, one or more notifications reporting status of one or more completion intervals of the transfer, and a separate progress page showing real-time progress of the transfer.

6. The method of claim 1, further comprising:
after switching the assignment of the one or more team member user accounts from the first team to the destination team, updating one or more databases to disassociate the one or more team member user accounts from access and privileges afforded to members of the first team, and to associate the one or more team member user accounts with access and privileges afforded to members of the destination team.

7. The method of claim 6, wherein the disassociation of the one or more team member user accounts from access and privileges afforded to members of the first team results in restricting access, by the one or more team member user accounts, to documents associated with the first team, groups associated with the first team, or applications associated with the first team.

8. The method of claim 1, further comprising:
provide a team member transfer interface to the administrator user, the administrator user having administrator rights concerning at least the first team and the team member transfer interface being effective to initiate the transfer of the one or more team member user accounts to the destination team;
receiving an identification of the one or more team member user accounts and the destination team in the team member transfer interface;
causing presentation of an informational prompt explaining aspects of the transfer of the one or more team member user accounts to the destination team; and
receiving an input effective to initiate the transfer of the one or more team member user accounts to the destination team.

9. The method of claim 8, wherein the team member transfer interface includes an interface element effective to allow the administrator user to specify whether the one or more team member user accounts should retain access to shared content items shared with the one or more team member user accounts after the transfer, wherein the shared content items are shared with the one or more team member user accounts by virtue of being a member of the first team.

10. The method of claim 1, wherein the administrator user is required to have the administrator rights concerning the destination team to initiate the transfer.

11. The method of claim 1, further comprising:
switching an assignment of another one or more team member user accounts from a second team by separately removing the another one or more team member user accounts from the second team and adding the another one or more team member user accounts to a second destination team, wherein the another one or more team member user accounts remain in a teamless state for a period of time during the switching of the assignment.

12. A non-transitory computer-readable medium comprising:
instructions stored therein which, when executed by one or more processors, cause the one or more processors to:
receive, from an administrator user having administrator rights to at least a first team, a request to transfer one or more team member user accounts from the first team to a destination team;
perform a set of validation checks to check for inconsistencies that would cause one or more errors during the transfer of the one or more team member user accounts from the first team to the destination team;
assign transfer pending status to the one or more team member user accounts, the transfer pending status imposing one or more restrictions preventing an action associated with the one or more team member user accounts from being performed;
switch an assignment of the one or more team member user accounts from the first team to the destination team in a single atomic action that includes adding the one or more team member user accounts to the destination team and removing the one or more team member user accounts from the first team; and
remove the transfer pending status from the one or more team member user accounts.

13. The non-transitory computer-readable medium of claim 12, wherein further instruction cause the one or more processors to:
provide at least one of: a transfer status progress indicator regarding process of the transfer, one or more notifications reporting status of one or more completion intervals of the transfer, and a separate progress page showing real-time progress of the transfer.

14. The non-transitory computer-readable medium of claim 12, wherein further instruction cause the one or more processors to:
notify the administrator user of any preemptive errors, wherein the set of validation checks are preemptively checked before input effective to initiate the transfer is received.

15. The non-transitory computer-readable medium of claim 14, wherein the set of validation checks include checking if sufficient number of licenses are available for the one or more team member user accounts to join the destination team.

16. The non-transitory computer-readable medium of claim 12, wherein further instruction cause the one or more processors to:
after switching the assignment, update one or more databases to disassociate the one or more team member user accounts from access and privileges afforded to members of the first team, and to associate the one or more team member user accounts with access and privileges afforded to members of the destination team.

17. The non-transitory computer-readable medium of claim 16, wherein the disassociation of the one or more team member user accounts from access and privileges afforded to members of the first team results in restricting access, by the one or more team member user accounts, to documents associated with the first team, groups associated with the first team, or applications associated with the first team.

18. A system comprising:
one or more processors; and
at least one computer-readable storage medium having stored therein instructions which, when executed by the one or more processors, cause the system to:
receive, from an administrator user having administrator rights to at least a first team, a request to transfer one or more team member user accounts from a first team to a destination team;
perform a set of validation checks to check for inconsistencies that would cause one or more errors during the transfer of the one or more team member user accounts from the first team to the destination team;
assign transfer pending status to the one or more team member user accounts, the transfer pending status imposing one or more restrictions preventing an action associated with the one or more team member user accounts from being performed;

switch an assignment of the one or more team member user accounts from the first team to the destination team in a single atomic action that includes adding the one or more team member user accounts to the destination team and removing the one or more team member user accounts from the first team; and remove the transfer pending status from the one or more team member user accounts.

* * * * *